US008313809B2

(12) United States Patent
Ilfrey (10) Patent No.: US 8,313,809 B2
(45) Date of Patent: Nov. 20, 2012

(54) SAME-DAY COATINGS AND PROCESSES (76) Inventor: Patrick Ilfrey, White Bear Lake, MN (US)

( * ) Notice: Subject to any disclaimer, the term of this patent is extended or adjusted under 35 U.S.C. 154(b) by 761 days.

(21) Appl. No.: 12/001,372

(22) Filed: Dec. 11, 2007

(65) Prior Publication Data

US 2009/0148683 A1 Jun. 11, 2009

(51) Int. Cl.
*B05D 7/26* (2006.01)

(52) U.S. Cl. .............. 427/407.1; 427/299; 427/307; 427/384; 427/386

(58) Field of Classification Search ........... 427/407.1, 427/299, 307, 384, 386
See application file for complete search history.

(56) References Cited

U.S. PATENT DOCUMENTS

| | | | |
|---|---|---|---|
| 2,683,730 A | 7/1954 | Seeger et al. ............... 560/359 |
| 2,950,263 A | 8/1960 | Abbotson et al. ........... 521/129 |
| 3,012,008 A | 11/1961 | Lister .......................... 528/67 |
| 3,344,162 A | 9/1967 | Rowton ....................... 560/347 |
| 3,362,979 A | 1/1968 | Bentley ........................ 560/359 |
| 3,394,164 A | 7/1968 | McClellan at at ........... 560/333 |
| 4,010,308 A * | 3/1977 | Wiczer ......................... 428/372 |
| 4,705,814 A | 11/1987 | Grigsby et al. .............. 521/159 |
| 4,748,192 A | 5/1988 | Smith .......................... 521/107 |
| 5,013,813 A | 5/1991 | Zimmerman et al. ........ 528/60 |
| 5,124,426 A | 6/1992 | Primeaux, II et al. ....... 528/60 |
| 5,126,170 A | 6/1992 | Zwiener et al. ............ 427/385.5 |
| 5,236,741 A | 8/1993 | Zwiener et al. ............ 427/385.5 |
| 5,243,012 A | 9/1993 | Wicks et al. ................. 528/58 |
| 5,266,671 A | 11/1993 | Primeaux, II et al. ....... 528/68 |
| 5,412,056 A | 5/1995 | Zwiener et al. .............. 528/73 |
| 5,442,034 A | 8/1995 | Primeaux, II et al. ....... 528/60 |
| 5,480,955 A | 1/1996 | Primeaux, II et al. ....... 528/60 |
| 5,489,704 A | 2/1996 | Squiller et al. .............. 560/35 |
| 5,504,181 A | 4/1996 | Primeaux, II et al. ....... 528/80 |
| 5,516,873 A | 5/1996 | Hicks et al. .................. 528/60 |
| 5,559,204 A | 9/1996 | Squiller et al. .............. 528/84 |
| 5,561,214 A | 10/1996 | Yeske et al. ................. 528/363 |
| 5,580,945 A | 12/1996 | Wade et al. .................. 528/49 |
| 5,616,677 A | 4/1997 | Primeaux, II et al. ....... 528/66 |
| 5,652,301 A | 7/1997 | Schmitt et al. .............. 524/591 |
| 5,731,397 A | 3/1998 | Primeaux, II et al. ....... 528/73 |
| 5,733,967 A | 3/1998 | Wicks et al. ................. 524/591 |
| 5,736,604 A * | 4/1998 | Luthra ......................... 524/591 |
| 5,821,326 A | 10/1998 | Kurek et al. ................. 528/332 |
| 5,847,195 A | 12/1998 | Roesler ........................ 560/35 |
| 6,005,062 A | 12/1999 | Hansen et al. ............... 528/68 |
| 6,169,140 B1 | 1/2001 | Roesler et al. ............... 524/588 |
| 6,183,870 B1 | 2/2001 | Hergenrother et al. ..... 428/423.1 |
| 6,355,829 B2 | 3/2002 | Roesler et al. ............... 560/25 |
| 6,399,736 B1 | 6/2002 | Primeaux, II et al. ....... 528/60 |
| 6,458,293 B1 | 10/2002 | Roesler et al. ............ 252/182.23 |
| 6,590,066 B1 | 7/2003 | Roesler ........................ 528/328 |
| 6,737,500 B1 | 5/2004 | Roesler ........................ 528/328 |
| 6,774,206 B2 | 8/2004 | Danielmeier et al. ....... 528/328 |
| 6,774,207 B2 | 8/2004 | Danielmeier et al. ....... 528/328 |
| 6,790,925 B2 | 9/2004 | Danielmeier et al. ....... 528/68 |
| 6,797,798 B2 | 9/2004 | Johnston ...................... 528/60 |
| 6,833,424 B2 | 12/2004 | Milhem ........................ 528/68 |
| 7,078,475 B2 | 7/2006 | Klein et al. .................. 528/64 |
| 7,169,876 B2 | 1/2007 | Asher ........................... 528/68 |
| 2005/0106395 A1* | 5/2005 | Asher ........................ 428/423.1 |
| 2005/0234216 A1 | 10/2005 | Klein et al. .................. 528/422 |

* cited by examiner

*Primary Examiner* — William Phillip Fletcher, III
(74) *Attorney, Agent, or Firm* — Chris Whewell (57) ABSTRACT

Provided herein are multi-layered coatings, suitable to be disposed on various substrates, as well as processes for producing the coatings. Coatings according to some embodiments of the disclosure are provided on a substrate by coating the substrate with a first layer, optionally coating the first layer with a second layer, and coating the second layer, when selected to be present with a top layer. Coating structures as provided herein can be applied to a substrate such as a garage floor, a truck bed, railcar, seatainer, tractor-trailers and the like within a single day, and can often be ready for human foot traffic within 2-4 hours after application of the top layer and can be ready for heavy traffic such as automobiles within 12-24 hours after application of the top layer.

33 Claims, 1 Drawing Sheet

SAME-DAY COATINGS AND PROCESSES

TECHNICAL FIELD

This disclosure relates generally to coatings for various substrates which coatings comprise a plurality of layers in a layered structure, disposed atop a substrate. More particularly it relates to multi-layered coating structures disposed in architectural applications, such as floors and walls, and to coatings useful in connection with heaving equipment such as the interior and exterior of railcars, containers, tractor-trailers and truckbeds.

BACKGROUND

Polymeric coatings are often employed to protect substrates such as floors, including concrete floors, from damage due to abrasions, and spills, and also to impart increased surface texture to provide the floors with skid resistance. Typically, the substrate must first be prepared by various cleaning steps prior to application of polymeric coatings. Additionally, it is often desirable by workers in the art to apply a plurality of coatings over one another on such substrates. Since polymeric coatings often require or are possessed of relatively long cure times, it is typical for the entire operation of coating a substrate, such as a floor, to require more than one day's time. This requirement using methods and coating schemes of the prior art is an inconvenience, inasmuch as it causes the area of the substrate that is desired to be coated to be effectively out of service for the amount of time that the entire substrate preparation, coating step(s), and final curing time occurs. In most cases, this can be two days or more. The present disclosure provides various processes and coatings on substrates which can be completed within a single day.

SUMMARY OF THE INVENTION

The present disclosure provides processes for providing a multi-layered structure which comprise the steps of: a) providing a substrate; b) coating the substrate with a first layer, the first layer comprising a polymer selected from the group consisting of: epoxy polymer coatings, polyurea polymer coatings, and polyurethane polymer coatings; c) optionally coating the first layer with a second layer, the second layer comprising a polymeric coating material selected from the group consisting of: epoxy polymer coatings, polyaspartic polyurea polymer coatings, polyurea polymer coatings, polyurethane polymer coatings, and urethane-modified acrylic polymer coatings; and d) coating the second layer when selected to be present, with a top layer, or alternately when the second layer is selected to not be present, coating the first layer, with a top layer, the top layer comprising a polymeric material selected from the group consisting of: polyaspartic polyurea polymer coatings, polyurea polymer coatings, urethane polymer coatings, and urethane-modified acrylic polymer coatings. In the instance of each layer, the selection of a material for a particular coating may be made independently of the materials selected for the other materials used as a coating according to such a process. Any combination of proscribed layer materials may be employed in a process as provided herein.

In one embodiment, the third layer is sufficiently cured to enable normal traffic and use of the substrate within twelve hours of initial application of the first layer to the substrate. In another embodiment, the third layer is sufficiently cured to enable normal traffic and use of the substrate within nine hours of initial application of the first layer to the substrate. In another embodiment, the third layer is sufficiently cured to enable normal traffic and use of the substrate within six hours of initial application of the first layer to the substrate. In another embodiment, the third layer is sufficiently cured to enable normal traffic and use of the substrate within four hours of initial application of the first layer to the substrate. Normal traffic and use means that typical persons can walk on and use the finished substrate without piercing through the coating to the substrate or otherwise substantially damaging the multi-layered coated structure provided.

In another embodiment, is provided a process for providing a multi-layered structure which comprises the steps of: a) providing a substrate, wherein the substrate comprises concrete; b) treating the concrete substrate with an aqueous mineral acid; and either allowing the concrete to dry or rinsing the concrete and subsequently permitting or causing it to dry, either by ambient air or by use of an air circulator, such as a fan or blower, c) coating the substrate with a first layer, the first layer comprising a coating material selected from the group consisting of: epoxy polymer coatings, polyurea polymer coatings, and urethane polymer coatings; d) optionally coating the first layer with a second layer, the second layer comprising a coating material selected from the group consisting of: epoxy polymer coatings, polyaspartic polyurea polymer coatings, polyurea polymer coatings, urethane polymer coatings and urethane-modified acrylic polymer coatings; e) optionally coating a layer selected from the group consisting of: the first layer; and the second layer when the second layer is selected to be present, with a third layer comprising a plurality of particles; and f) coating the second layer, when selected to be present, with a top layer, or alternately when the second layer is not selected to be present, coating a layer selected from the group consisting of: the first layer; and the third layer, with a top layer material, the top layer material comprising a coating material selected from the group consisting of: polyaspartic polyurea polymer coatings, polyurea polymer coatings, urethane polymer coatings, and urethane-modified acrylic polymer coatings, and wherein the coating composition employed in providing the first layer comprises an aqueous dispersion that includes one or more polymers selected from the group consisting of: epoxy polymers, polyurea polymers, and urethane polymers.

The aqueous mineral acid may comprises one or more acids selected from the group consisting of: hydrochloric acid; hydrobromic acid; hydiodic acid; phosphoric acid; phosphorous acid; sulfuric acid; and nitric acid. The acid content in the aqueous mineral acid is any amount between about 2% and 15% by weight based on the total weight of the acid solution. In one embodiment, the step of applying the first layer to the substrate is initiated within about 2 hours of initiating the step of treating the substrate with an aqueous mineral acid. In another embodiment, the step of applying the first layer to the substrate is initiated within about 1 hour of initiating the step of treating the substrate with an aqueous mineral acid. In one embodiment, the step of applying the first layer to the substrate is initiated within about 1 hour of completion of the drying step. In many embodiments, the drying step is complete when no sheen is visible on the concrete due to water present on its surface. In other embodiments, the drying step can be considered complete when no visible liquid water is present on the surface of the concrete, even though the surface still includes moisture adsorbed thereon (and may be visibly darker to the eye than the same surface when it is thoroughly dry), which according to preferred embodiments is acceptable when a first layer is to be provided using an aqueous dispersion of a polymer. In many embodiments, the drying step is complete when the surface of the concrete is absolutely dry. In many embodiments, the drying step is complete when the surface of the concrete is substantially after drying step, as it was prior to the acid-wash step. All embodiments herein described or taught may employ the above definitions of when the substrate is considered dry, and in applying these definitions to the various embodiments described herein, further alternate embodiments of this disclosure are accordingly provided. In other embodiments, the step of applying the first layer to the substrate is initiated within about 30 minutes of completion of the drying step. In other embodiments, the step of applying the first layer to the substrate is initiated within about 15 minutes of completion of the drying step. In other embodiments, the step of applying the first layer to the substrate is initiated immediately after completion of the drying step. In other embodiments, the step of treating the substrate with an aqueous mineral acid includes a rinsing step after application of the aqueous acid, and a drying step, subsequent to the rinsing step.

Also provided are multi-layered coated structures which comprise: a) a substrate; b) a first layer disposed over the substrate, the first layer comprising a polymer selected from the group consisting of: epoxy polymer coatings, polyurea polymer coatings, and polyurethane polymer coatings; c) a second layer disposed over the first layer, the second layer comprising a polymeric coating material independently selected from the group consisting of: epoxy polymer coatings, polyaspartic polyurea polymer coatings, polyurea polymer coatings, polyurethane polymer coatings, and urethane-modified acrylic polymer coatings; d) a third layer disposed over the second layer, the third layer comprising a polymeric material independently selected from the group consisting of: polyaspartic polyurea polymer coatings, polyurea polymer coatings, polyurethane polymer coatings, and urethane-modified acrylic polymer coatings.

DETAILED DESCRIPTION

Figure 1:
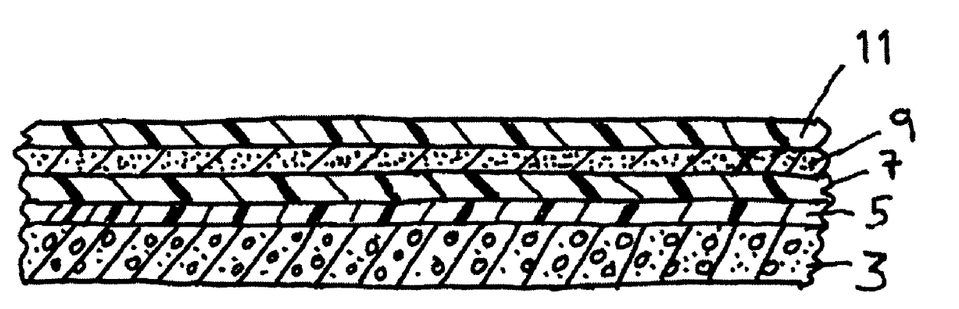
FIG. 1 shows a cross-sectional view of a multi-layer coating provided on a substrate according to one embodiment of the present disclosure.

Referring to the drawing sheet FIG. 1 there is shown a cross-sectional view of a multi-layered coating provided on a substrate according to one embodiment of the present disclosure. In one embodiment, a completed multi-layered coating as shown in FIG. 1 may be provided within 24 hours. In another embodiment, a completed multi-layered coating as shown in FIG. 1 may be provided within 18 hours. In another embodiment, a completed multi-layered coating as shown in FIG. 1 may be provided within 12 hours. In yet another embodiment, a completed multi-layered coating as shown in FIG. 1 may be provided within 6 hours. In yet another embodiment, a completed multi-layered coating as shown in FIG. 1 may be provided within 4 hours. In yet another embodiment, a completed multi-layered coating as shown in FIG. 1 may be provided within about 3 hours. The amount of time required for providing a completed multi-layered coating as shown in FIG. 1 is dependent on the desired final structure, the materials selected for application to the substrate, the ambient conditions, including temperature and humidity, and the rate of application, in square feet per gallon, of the various layers employed. In general, thinner layers allow for faster cure times and a reduced time for application of all layers is accomplished by meticulous application of the various materials used for providing the layers, as described below.

In FIG. 1 there is shown a substrate layer 3, a first layer 5, an optional second layer 7, an optional third layer 9, and a top layer 11. The substrate layer 3 in one embodiment may be a horizontal surface, such as flooring, including concrete floors as commonly found on driveways, in garages, parking lots, warehouses, pharmaceutical manufacturing facilities, restrooms, animal kennels, restaurants, medical treatment facilities, laboratories, retail areas, basements, patios, automotive sales and service areas, residential and commercial dwellings, and roads; however, the substrate layer 3 may also comprise a vertical surface, including those found on steps, walls, poles, columns, container interiors, railcars, truckbeds, tractor-trailers, utility trailers, animal trailers, and essentially any solid surface. Although such surfaces and substrates are in one embodiment comprised of concrete, other materials including asphalt mixtures, "blacktop", wood, metals, painted surfaces, and structural composites are also viable candidates as a substrate 3 over which various layers according to this disclosure may be disposed.

It is preferable in general to prepare the substrate 3 prior to application of the first layer 5, in order to promote adhesion between the first layer 5 and the substrate 3. Various means of substrate preparation are known in the art, including acid-etching in the case where the substrate 3 is concrete. Various acids are suitable for this purpose, including aqueous solutions which comprise one or more acids selected from the group consisting of: hydrochloric acid; hydrobromic acid; hydiodic acid; phosphoric acid; phosphorous acid; sulfuric acid; and nitric acid. Preferably, the total concentration of acid present in an aqueous solution to prepare a concrete surface according to the present disclosure, either neat or mixed, is any amount between about 2% and 15% by weight based on the total weight of the acid solution. An acid pre-wash step of the substrate to be coated herein is indicated as being an option for every embodiment taught or described in this specification and the claims appended hereto. This is in contrast to methods of the prior art, which typically precluded a worker from applying a polyurea polymeric coating to a substrate following an acid-wash step of the concrete, because of inferior and indeed unsuitable adhesion between the polyureas and the substrate that would result due to the moisture that was introduced into the concrete during the washing process. Thus, the concrete would need to thoroughly dry at least overnight, thus precluding the short installation times of multi-layered coated structures as provided herein. In some cases, concrete floors have a hardener coating over them, which is preferably removed prior to applying a first layer 5 as provided herein. Floor grinding machines comprising rotating or vibrating metallic discs having a layer of diamond particles adhered thereto are commonly used on floor surfaces to remove the top layer of material and to profile the surface prior to coating with a first layer 5. The types of metal bonded diamonds used on different concretes commonly employed can include: hard bonded diamond, which is used for soft, open, and porous concrete; medium bond diamond, used for general purpose and broom finished concrete; and soft bond diamond, used for very hard, steel trowel, and/or burnished slabs.

A multi-layer structure as provided herein may be provided generally by applying a first layer of material over the substrate 3, permitting the material to dry or cure sufficiently, and then applying another layer over the first layer. Materials for many of the various layers are viscous liquids, which may be applied manually, using a brush, a flat roller, a napped roller, or sprayed onto the substrate 3 using an equipment combination as described in my co-pending U.S. patent application having Ser. No. 11/656,112 filed Jan. 22, 2007, the entire contents of which are herein incorporated by reference thereto. In the case of the optional layer 9 as later described, the material may be applied using a broadcast spreader, or by hand.

The first layer 5 in one embodiment comprises an epoxy coating, which, as in the cases of the second layer 7, and top layer 11, may be provided by coating the substrate 3 with a composition which contains an epoxy dispersion or a reactive mixture of epoxy polymer precursors. A coating composition from which a first layer 5 (and other layers herein) is provided may be applied manually, using a brush, a flat roller, a napped roller, or sprayed onto the substrate 3 using an equipment combination as described in my co-pending U.S. patent application described above.

Typically, aqueous-based epoxy dispersions are two-component mixtures, comprising a first component and a second component, the two components each being supplied separately and mixed just prior to application, wherein the first component comprises an epoxy resin and wherein the second component comprises a curing agent and water, as is known in the art. In the case of such epoxy coating compositions, one component of the two part mixture from which the curable blend is formed, the (A) component, may be any material or mixture of two or more materials which contains at least two epoxy groups in its (their) molecular structure, including, for illustrative purposes, and without limitation: epoxy NOVOLAC D.E.N.® 438 resin, D.E.R.® 354 resin, and NOVOLAC D.E.N.® 431 resin, (all trademarks of the Dow Chemical Company), ARALDITE® EPN 1180 resin (Ciba-Geigy) as well as other epoxy resins and precursors specified in US Patent Application US 2005/0234216, the entire contents of which are herein incorporated by reference thereto. Essentially any organic molecule having two epoxy groups are generally suitable as raw materials from which epoxy polymers may be provided by admixture with a polyamine. The (B) component of an epoxy coating formulation may be any organic polyamine that is known to be useful in the art for producing curable epoxy compositions, including without limitation all polyamino compounds described, specifically recited, and/or incorporated by reference herein, including primary and secondary polyamines, whether they are aliphatic, aromatic or polyether polyamines. Thus, the (B) component, or amine-containing component, typically comprises one or more organic polyamino compound(s) which have at least one active hydrogen on each of two nitrogen atoms present on a single molecule of such compound(s), or in a mixture of two or more such polyamino compounds. A hydrogen atom is considered to be an active (or reactive) hydrogen for purposes of the instant disclosure and the claims appended hereto, if it is capable of participating in the Zerevitinov reaction (Th. Zerevitinov, Ber. 40, 2023(1907)) to liberate methane from methylmagnesium bromide. Any polyamine compound having at least two nitrogen atoms in its molecular structure, wherein each of at least two of the nitrogen atoms present in the molecule have at least one active hydrogen atom attached to them, are suitable as components of the (B) component from which an epoxy composition useful for providing a first layer 5 according to the present disclosure may be derived. Suitable amines include, without limitation, N-aminoethylpiperazine; diethylenetriamine; triethylenetetramine; tetraethylenepentamine; 2-methylpentamethylene; 1,3-pentanediamine; trimethylhexamethylene diamine; polyamides; polyamidoamines; Mannich-base diamines and triamines; bis(aminomethyl)cyclohexylamine; isophorone diamine; menthane diamine; bis(p-aminocyclohexyl)methane; 2,2'-dimethyl bis(p-aminocyclohexyl)methane; dimethyldicyclohexylmethane); 1,2-diaminocyclohexane; 1,4-diaminocyclohexane; meta-xylene diamine; norbornanediamine; meta-phenylene diamine; diaminodiphenylsulfone; methylene dianiline; JEFFAMINE® D-230 amine; JEFFAMINE® D-400 amine; JEFFAMINE® T-403 amine; and diethyltoluenediamine. Also suitable are blends comprised of mid-to high-molecular weight polyether polyamines, low-molecular weight amine chain extenders, and other optional additives such as pigments, adhesion promoters, and light stabilizers. The polyether polyamines may serve as the mid- to high-molecular weight amine components and are a key building block in the layer's soft block segments. In one embodiment, suitable polyether amines include those commercially available from Huntsman LLC of The Woodlands, Tex., including without limitation amines, JEFFAMINE® D-2000 amines, and JEFFAMINE® T-5000 amines, and substantial functional equivalents thereof from other suppliers including BASF. According to one preferred embodiment, a two-component aqueous based epoxy dispersion coating material that is suitable for providing a first layer 5 is the material known as CFFS-711™ coating, available from Citadel Floor Finishing Systems of 3001 103$^{rd}$ Lane Northeast, Blaine, Minn. 55449 ("Citadel").

In an alternate embodiment, the first layer 5 may comprise a urethane polymer (polyurethane) that is provided by applying a coating composition to the substrate 3. Suitable urethane polymer coating compositions for providing a first layer 5 include single-component solvent-based moisture-cure polyurethane materials such as the material known as CFFS-511™ coating product, available from Citadel, and functional equivalents thereof. In another embodiment, water-based polyurethane coating materials, such as MINWAX® Water-Based for Floors products are useful as a composition from which the first layer 5 may be provided. Thus, single-component and two-part polyurethane coating compositions are useful for providing a first layer 5 herein. Two-part coating composition materials are known to comprise an "A" component and a "B" component, which are generally mixed together just prior to their application to a substrate. The (A) component, or organic poly-isocyanate component useful in providing a polyurethane (or polyurea) coating composition for providing one or more layers of a multi-layer structure as provided herein, may comprise any number of suitable aromatic or aliphatic-based prepolymers or quasi-prepolymers as a component. These include standard isocyanate compositions known to those skilled in the art. Preferred examples include MDI-based quasi-prepolymers such as those available commercially as RUBINATE® 9480, RUBINATE®. 9484, and RUBINATE® 9495 from the Huntsman family of companies of 10003 Woodloch Forest Drive in The Woodlands, Tex. The isocyanates employed in component (A) can include aliphatic isocyanates described in U.S. Pat. No. 4,748,192. These include aliphatic di-isocyanates and, more particularly, are the trimerized or the biuretic form of an aliphatic di-isocyanate, such as hexamethylene di-isocyanate ("HDI"), or the bi-functional monomer of the tetraalkyl xylene di-isocyanate, such as the tetramethyl xylene di-isocyanate. Cyclohexane di-isocyanate is also to be considered a useful aliphatic isocyanate. Other useful aliphatic polyisocyanates are described in U.S. Pat. No. 4,705,814. These include aliphatic di-isocyanates, for example, alkylene di-isocyanates with 4 to 12 carbon atoms in the alkylene radical, such as 1,12-dodecane di-isocyanate and 1,4-tetramethylene di-isocyanate. Also useful are cycloaliphatic di-isocyanates, such as 1,3 and 1,4-cyclohexane di-isocyanate as well as any mixture of these isomers, 1-isocyanato-3,3,5-trimethyl-5-isocyanatomethylcyclohexane(isophorone di-isocyanate); 4,4'-,2,2'- and 2,4'-dicyclohexylmethane di-isocyanate as well as the corresponding isomer mixtures, and the like. All U.S. patents mentioned in this specification are herein fully incorporated by reference thereto.

A wide variety of aromatic polyisocyanates may also be used in providing a coating composition from which a layer of a multi-layered coated structure of the present disclosure may be provided. Aromatic polyisocyanates which are useful for this include p-phenylene di-isocyanate, polymethylene polyphenylisocyanate, 2,6-toluene di-isocyanate, dianisidine di-isocyanate, bitolylene di-isocyanate, naphthalene-1,4-di-isocyanate, bis(4-isocyanatophenyl)methane, bis(3-methyl-3-iso-cyanatophenyl)methane, bis(3-methyl-4-isocyanatophenyl)methane, and 4,4'-diphenylpropane di-isocyanate. Other useful aromatic polyisocyanates include methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing polyamines and corresponding methylene-bridged polyphenyl polyisocyanates therefrom are described in the literature and in many patents, for example, U.S. Pat. Nos. 2,683,730; 2,950,263; 3,012,008; 3,344,162 and 3,362,979. Usually methylene-bridged polyphenyl polyisocyanate mixtures contain about 20 to about 100 weight percent methylene di-phenyl-di-isocyanate isomers, with the balance being polymethylene polyphenyl di-isocyanates having higher functionalities and higher molecular weights. Typical of these are polyphenyl polyisocyanate mixtures containing about 20 to about 100 weight percent di-phenyl-di-isocyanate isomers, of which about 20 to about 95 weight percent thereof is the 4,4'-isomer with the remainder being polymethylene polyphenyl polyisocyanates of higher molecular weight and functionality that have an average functionality of from about 2.1 to about 3.5. These isocyanate mixtures are known, commercially available materials and can be prepared by the process described in U.S. Pat. No. 3,362,979. One preferred aromatic polyisocyanate is methylene bis(4-phenylisocyanate) or MDI. Pure MDI, quasi-prepolymers of MDI, modified pure MDI, etc. are useful to prepare coatings suitable for employment as providing one or more layers herein. Since pure MDI is a solid and, thus, often inconvenient to use, liquid products based on MDI or methylene bis(4-phenylisocyanate) are also useful herein. U.S. Pat. No. 3,394,164 describes a liquid MDI product. More generally, uretonimine modified pure MDI is included also. This product is made by heating pure distilled MDI in the presence of a catalyst. The liquid product is a mixture of pure MDI and modified MDI. The term "isocyanate" as used herein also includes quasi-prepolymers of isocyanates or polyisocyanates with active-hydrogen containing materials. Thus, any of the isocyanates mentioned herein may be used as the isocyanate component in forming or providing a polyurethane coating composition useful as a material from which a first layer 5 may be derived, and any known polyol material useful for providing a polyurethane coating material may be employed therewith. The material known as, CFFS-DC™ two-part polyurethane, available from Citadel, is a preferred coating composition from which a first layer 5 may be provided.

In other embodiments the first layer 5 may comprise a polyurea layer, provided using a coating composition which comprises either a single-component polyurea or a two-component polyurea. Single-component polyurea coating compositions are known in the art and include, without limitation, those described in U.S. Pat. No. 5,652,294, MCI®-2027 polyurea coating available from Cortec Corporation of St. Paul Minn., PG-SCAL-10™ coating available from Poly-Granite International, Inc. of Wilmington Calif., and CHEMTHANE® 1400 coating available from Chemline Incorporated of St. Louis, Mo. Such single-component polyureas are typically dispersions as is the case with some epoxies, as is well-known. Preferred single-component polyurea coatings are those which typically cure in from 1 to 2 hours after their application.

Two-part polyurea coating compositions suitable for providing a first layer 5 of a multi-layer coated structure provided herein include those produced from mixing any isocyanate and any polyamine described or referenced in this disclosure, and this mixing can be accomplished using the equipment described in my co-pending U.S. patent application having Ser. No. 11/656,112 filed Jan. 22, 2007, using mixing and spray equipment manufactured by the Gusmer Company or Graco Company, as such is well-known in the art, or by mechanical mixing of separate liquid components, each of which are mixtures which comprise a particular isocyanate and polyamine selected.

Some properties of two materials suitable as a first layer 5 material are specified in Table I below:

TABLE I properties of some materials suitable as layers herein

| Material | Vol. Solids | Wt. % Solids | Visc cP@25° C. | Pot Life | V.O.C. Lbs./gal. | TFT | Layer Thickness |
|---|---|---|---|---|---|---|---|
| CFFS-511 ™ | 54% | — | — | n/a | 3.3 | 4 hrs | 0-3 mil |
| CFFS-711 ™ | 46% | 60% | 500 | >3 hrs | 0 | 2 hrs | 0-2 mil |

Additionally, the CFFS-511™ moisture-cure polyurethane material has a maximum weight loss (ASTM D-4060) of 28 mg., and a direct impact resistance of 160 in. lb. and an indirect impact resistance of 160 in. lb. (ASTM D-2794). The CFFS-711™ material has a pencil hardness of 2H, a ¼ inch mandrel (ASTM D1737) bend value of 180°, a direct impact value of 50 in. lb. (ASTM D-2794), and a reverse impact (Gardner Company) value of 4 in. lb.

It is preferable to provide a coating composition from which the first layer 5 is to be derived at a coverage rate that permits it to have a cure time of 1-2 hours, that is then sufficiently cured, to enable application of a subsequent layer (second layer 7, third layer 9, top layer 11) and more preferably in about 45 minutes to one hour, in order that the remaining layers of a multi-layered coating according to this disclosure be completed well within a single day's time, preferably less than 12 hours and more preferably less than about four hours. Longer cure times (sufficient for application of another layer atop the first layer 5) for the first layer 5 are permissible, provided that the coverages and ambient conditions for the remaining layers overall are favorable for a quick installation of a completed multi-layered coating. Thus, the coating composition employed for providing a first layer 5 may be any epoxy coating, whether solvent-based or water-based with CFFS-711™ coating (aqueous) being preferred. It is preferable to employ the aqueous epoxy dispersion when the ambient temperature is above about 40° Fahrenheit, and to employ a solvent-based dispersion at ambient temperatures below about 40° Fahrenheit, such as CFFS-511™ coating.

In one embodiment, the first layer 5 has a tack-free time of about 4 hours, the tack-free time ("TFT") being the amount of time between the application of the first layer 5 to the substrate 3 and the time at which the surface of the layer 5 does not transfer to other substrates. For example, prior to the TFT, a finger touched on a laid first layer 5 will adsorb some of the material of the first layer 5. One method of testing for this is to depress a clean finger onto the first layer 5 some time after it has been laid, sufficiently to leave an indentation and then slowly drawn away. The first point in time after laying the first layer 5 at which no material adheres to the fingertip so contacted is the TFT. This same criteria useful for adjudging the TFT of the second layer 7, and top layer 11 as well. In another embodiment, the first layer 5 has a TFT of about 3 hours. In another embodiment, the first layer 5 has a TFT of about 2 hours. In another embodiment, the first layer 5 has a TFT of about 45 minutes. In other embodiments, the first layer 5 has a TFT of any value between about 45 minutes and four hours. The TFT for a first layer 5 is dependent upon the thickness at which the first layer 5 is applied on the substrate 3, the ambient temperature, and the chemical makeup of the coating composition employed. In one embodiment, the composition from which the first layer 5 is produced is an aqueous epoxy composition and is applied to the substrate 3 at a rate of about 400 ft$^2$/gallon, and yields a finished first layer having a thickness of about 1.9 mils. In another embodiment, the composition from which the first layer 5 is produced is an aqueous epoxy composition and is applied to the substrate 3 at a rate of about 300 ft$^2$/gallon, and yields a finished first layer having a thickness of about 2.5 mils. In another embodiment, the composition from which the first layer 5 is produced is an aqueous epoxy composition and is applied to the substrate 3 at a rate of about 200 ft$^2$/gallon, and yields a finished first layer having a thickness of about 4.8 mils. Other embodiments having first layers 5 with thicknesses that resided between the above values may be readily produced by extrapolation of the coverage rate to the thickness desired.

In another embodiment, the composition from which the first layer 5 is produced is a moisture-cure polyurethane coating composition and is applied to the substrate 3 at a rate of about 400 ft$^2$/gallon, and yields a finished first layer having a thickness of about 2.4 mils. In another embodiment, the composition from which the first layer 5 is produced is a moisture-cure polyurethane composition and is applied to the substrate 3 at a rate of about 325 ft$^2$/gallon, and yields a finished first layer having a thickness of about 3 (three) mils In another embodiment, the composition from which the first layer 5 is produced is a moisture-cure polyurethane composition and is applied to the substrate 3 at a rate of about 200 ft$^2$/gallon, and yields a finished first layer having a thickness of about 5 (five) mils. Other embodiments having a first layer 5 with thicknesses that resided between the above values may be readily produced by extrapolation of the coverage rate to the thickness desired, as may be done for all other layers of a multi-layered coating structure as provided herein.

Regardless of the material used for the first layer 5, after curing the thickness of the first layer 5 may be any thickness in the range of between about 0.8 mils and about 3.2 mils or greater, up to about 15 mils if desired, including all ranges within the range of 0.8-15 mils. In general, it is preferred that the coating composition employed for the top layer 5 be applied at a rate sufficient to enable the top layer 5 to have a thickness of any value between about 2 mils and about 15 mils, after curing, including all ranges of thicknesses within the range of 2 to 15 mils, with thicknesses in the range of about 2 to 7 mils being especially preferred.

While particular materials have been described as being suitable as first layer 5 coating materials in a multi-layer coated structure provided herein, one of ordinary skill immediately recognizes after reading this disclosure that other commercially-available epoxy, polyurethane, and polyurea coating materials, both aqueous and solvent-based are suitable for employment as materials from which a first layer 5 may be provided according to the present disclosure.

The second layer 7 of a multi-layered coating as shown in FIG. 1 is optional and when selected to be present may be provided by applying a coating composition to (atop) the first layer 5, after the first layer 5 has cured sufficiently to enable a workman to tread on the surface of the first layer 5 without damaging or otherwise compromising its integrity during the course of the application of the second layer 7.

In one embodiment, a composition employed in providing the second layer 7 is identical in terms of the composition of the polymeric layer it produces to that employed in providing the first layer 5, i.e., the second layer 7 may in one embodiment comprise a layer of an epoxy polymer, derived from any of the materials described above or otherwise taught herein as useful for providing a first layer 5 and having a thickness, application rate, TFT and cure times within those ranges specified for the first layer 5. In one embodiment, the second layer 7 may, for example, comprise a layer of epoxy polymer, derived from any of the materials described above as useful for providing a first layer 5 and having thicknesses, application rates, and cure times specified for the first layer 5, but wherein the epoxy provided by the coating composition used to provide the second layer 7 is different from the epoxy coating composition used in providing the first layer 5. Thus, the coating composition employed to provide the second layer 7 may be identical to or different than that employed in providing the first layer 5, with each composition being within the description of the compositions suitable for providing the first layer 5; however, the coating composition from which the second layer 7 is provided may be applied at a coating rate (sq. ft./gal.) that is greater than or less than that of the first layer 5, by any amount, wherein the coating rate for each the first layer 5 and second layer 7 are both within the parameters specified above for the first layer 5.

In another embodiment, the coating composition from which the second layer 7 is provided comprises a polyaspartic polyurea polymer, or reactive precursors for a polyaspartic polyurea polymer, which polymers are sometimes referred to as polyaspartate ester polyureas. Coating materials comprising polyaspartate ester polyureas or precursors thereof useful in accordance with the present disclosure include, without limitation, those prepared using materials and/or components described in U.S. Pat. Nos. 6,790,925; 6,774,206; 6,774,207; 6,737,500; 6,605,684; 6,590,066; 6,458,293; 6,399,736; 6,355,829; 6,183,870; 6,169,140; 6,013,755; 5,580,945; 5,847,195; 5,736,604; 5,733,967; 5,652,301; 5,561,214; 5,559,204; 5,529,739; 5,516,873; 5,489,704; 5,236,741;

5,126,170; and 4,324,716, all of which whose entire contents are herein incorporated by reference thereto. The polyaspartates (polyasparticester-derived) may be used as the only isocyanate-reactive component or they may be blended with polyols, polyamines or blocked polyamines, such as ketimines, aldimines, or oxazolidines. Such compositions are known to be suitable for the preparation of high quality coatings that are abrasion resistant, solvent resistant, and weather resistant.

Polyaspartic polyurea coating compositions useful in accordance with the present disclosure for providing a second layer 7 are typically formed by admixture of an (A) component and a (B) component. Within the terminology used in the United States, the (A) component comprises an organic polyisocyanate, and the (B) component is capable of reacting with the (A) component and comprises one or more polyaspartate ester compounds, wherein the polyaspartate ester compounds have a reactive hydrogen atom attached to nitrogen atoms of the aspartate ester units in the polyaspartate, as is known in the art. Any of the isocyanates mentioned or referred to herein may be employed as the isocyanate component in forming a polyaspartic polyurea coating material useful as a second layer 7 according to the present disclosure, either alone or in combination with other aforementioned isocyanates.

In one embodiment when the coating composition from which the second layer 7 is provided comprises a polyaspartic polyurea, the second layer 7 has a tack-free time of about 15 seconds. In other embodiments, the second layer 7 has a TFT of about 45 minutes to 1 hour. In another embodiment, the second layer 7 has a TFT of about 2 hours. In other embodiments, the second layer 7 has a TFT of any amount of time between about 15 seconds and 2 hours. The exact TFT's for a given composition from which a second layer 7 may be provided depend chiefly upon the particular polyaspartic ester and isocyanate employed. In general, but not always, shorter TFT's are desirable, as is the case with all layers herein, since one object of this disclosure is to provide a multi-layered coating as depicted in FIG. 1 within a single day, often less than 8 hours, and especially desirably in about 3 hours from the time the first layer 5 is contacted to the substrate 3. Generally speaking, the TFT for a second layer 7 is dependent upon the thickness at which the second layer 7 is applied on the first layer 5, the ambient temperature, and the chemical makeup of the coating composition employed. In one embodiment, the composition from which the second layer 7 is produced is a polyaspartic ester polyurea composition and is applied to the first layer 5 at a rate of about 1600 ft$^2$/gallon, and yields a finished first layer having a thickness of about one mil. In another embodiment, the composition from which the second layer 7 is produced is a polyaspartic ester polyurea composition and is applied over the first layer 5 at a rate of about 800 ft$^2$/gallon, and yields a finished first layer having a thickness of about 2 mils. In another embodiment, the composition from which the second layer 7 is produced is a polyaspartic ester polyurea composition and is applied to the first layer 5 at a rate of about 400 ft$^2$/gallon, and yields a finished first layer having a thickness of about 4 mils. In another embodiment, the composition from which the second layer 7 is produced is a polyaspartic ester polyurea composition and is applied to the first layer 5 at a rate of about 320 ft$^2$/gallon, and yields a finished first layer having a thickness of about 5 mils. Other embodiments having second layer 7 with thicknesses that resided between the above values may be readily produced by extrapolation of the coverage rate to the thickness desired.

One preferred polyaspartic polyurea coating material useful for providing a second layer 7 in accordance with the present disclosure is that known as CFFS-RG 70™ product available from Citadel Floor Finishing Systems of 3001 103$^{rd}$ Lane Northeast, Blain, Minn. 55449. Another polyaspartic polyurea coating material useful for providing a second layer 7 in accordance with the present disclosure is that known as CFFS-RG 100™ product, available from Citadel. Typical physical properties of these products are set forth in Table II below:

TABLE II

| Parameter | Test Method | Product CFFS-RG 70 ™ product | Product CFFS-RG 100 ™ product |
|---|---|---|---|
| Tensile Stength | ASTM D412 | 6000 | 6000 |
| Elongation | ASTM D412 | 100 | 100 |
| Tear Strength (lbs/linear in.) | ASTM D2240 | 330 | 330 |
| Hardness, Shore D | ASTM D2240 | 73 | 73 |
| Flexibility, ⅛" Mandrel | ASTM D1737 | Pass | Pass |
| Falling Sand Abrasion Resistance | ASTM D 968 | 30 | 30 |
| Tabor Abrasion mg loss | ASTM D4060 | 30 | 30 |
| Viscosity B-component | — | 1400-1500 cP @ 75° C. | 1400-1500 cP @ 75° C. |
| Viscosity, A-component | — | 700-800 P @ 75° C. | 700-800 P @ 75° C. |
| Gloss | ASTM D523 | >90 | >90 |

In another embodiment, a coating composition from which a second layer 7 may be provided may comprise a polyurea polymer dispersion or precursors of polyurea polymers, including all polyamines and isocyanates previously set forth. A coating material from which a second layer 7 can be provided according to this disclosure may be a single-component or a two-part polyurea. Any polyurea coating material made using isocyanates and polyamines specified or described herein or known in the art are useful in providing a coating material from which the top layer 7 may be comprised, including without limitation those coatings materials specified herein as being suitable for providing a first layer 5. Any known polyamine material useful for providing a polyurea coating material may be employed, including without limitation those polyamines disclosed herein and others known in the art.

In yet another embodiment, a coating composition from which a second layer 7 may be provided comprises a urethane polymer (polyurethane) or precursors to polyurethane polymers, including those compositions disclosed and/or provided herein as being suitable for providing a first layer 5. Thus, any of the isocyanates mentioned above may be used as the isocyanate component in forming or providing a polyurethane coating composition useful as a material from which a second layer 7 may be derived, and any known polyol material useful for providing a polyurethane coating material may be employed therewith.

In another embodiment, the coating composition from which the second layer 7 is provided comprises a polymeric urethane-modified acrylic material or precursors thereof. Essentially any urethane-modified acrylic composition that is intended or formulated for providing a coating on a substrate is suitable for use as a second layer 7 according to this disclosure provided it is spreadable using equipment/techniques described above herein and provided it yields a urethane-modified acrylic polymer coating upon its curing. These include, without limitation, such urethane-modified acrylic coatings such as: Eco-TPS™ coatings supplied by Tennant Company of Minneapolis, Minn., Product #20 and Product #35 available from Perma, Inc. of Bedford Mass., Ultra Surface Acrylic Urethane™ from Concrete Solutions of San Diego, Calif., spreadable, curable compositions comprising the urethane acrylates sold by BASF under the trademark LAROMER®, and SHERTHANE® 2K urethane coating from the Sherwin-Williams Company of Cleveland Ohio. One preferred composition comprising a urethane-modified acrylic in dispersion form is that known as ORDCLR/W™ product, available from Citadel Floor Finishing Systems of Blaine, Minn. Some physical parameters of ORDCLR/W™ product are set forth in Table III below. The rating key for the chemical spot tests performed on the cured material is: 10=no effect; 5=moderate swelling, softening and whitening; and 0=completely dissolved.

TABLE III

| | |
|---|---|
| Gloss, 60° (ASTM D 523) | 74 |
| Solids (by weight %) | 40 |
| Impact Resistance (ASTM D 2794) | |
| Direct and Reverse, in-lb | >160 |
| Flexibility, % | |
| Conical Mandrel Bend (ASTM D 522) | >32 |
| Tensile Strength (psi) | 4400 |
| Elongation, % | >32 |
| Hardness | |
| Persoz, s (ASTM D 4366) | 200 |
| Pencil (ASTM D 3363; scratch/gouge) | F/3H |
| Double Rubs (ASTM D 4752) | |
| Isopropanol | 90 |
| Methylethyl ketone | >200 |
| Chemical Spot Tests, 1 hour after coating Exposure (ASTM D 1308)* | |
| Household Bleach | 10 |
| Vinegar | 10 |
| Olive Oil | 10 |
| Fantastick ® Cleaner | 9 |
| 10% aqueousAmmonia | 10 |
| Isopropanol | 7 |
| 50% Ethanol/water | 8 |

The thickness of the second layer 7, regardless of the material which it comprises, may be any thickness in the range of between about 0.8 mil and about 15 mils, including all ranges within the range of 0.8-15 mils with thicknesses between about 2.8 and 4 mils being most preferable in many embodiments.

According to alternate embodiments of multi-layer coating structures provided herein, the second layer 7 may not be present and the second layer 7 may thus be regarded as being optional. All embodiments taught or described in the instant specification may be produced having no second layer 7 present. In such embodiments, materials from which the optional third layer 9 and/or the top layer 11 are provided are applied directly over the first layer 5. When present, the coating material from which the third layer 9 is to be provided may be applied over the first layer 5 and subsequently a composition from which a top layer 11 is provided is applied over the third layer 9. In another alternative embodiment, the composition from which a top layer 11 is provided is applied directly over the first layer 5. The material used in providing the third layer 9 may also be applied over the second layer 7, when the second layer 7 is selected to be present, and then a coating material from which a top layer 11 is to be provided may be subsequently applied over the third layer 9.

The optional third layer 9, when present, is preferably comprised of a plurality of solid particles, which may be particles of mineral matter, but is not limited to mineral matter, and may comprise non-mineral matter. Mineral matter includes all known minerals, as the word "mineral" is understood by geologists and others skilled in the mineral-related arts. Aggregates are minerals within this class, and all aggregates disclosed within the document entitled: "Natural Aggregates of the Conterminous United States" by William H. Langer (U.S. Geological Survey Bulletin 1594, second printing, 1993), the entire contents of which are herein incorporated by reference, are suitable for use as a third layer 9 within the context of the present disclosure. Suitable solid particles which may comprise the third layer 9 include without limitation sand, crushed glass, calcium carbonate, seashells, stone, crushed stone, gravel, quartz, flints, cherts, and aluminum oxides (corundums) of various particle sizes, which may be any particle size in the range of between one micron and three millimeters, and including all ranges of sizes therebetween. The exact particle size may or may not be critical to the functioning of a multi-layered coating according to this disclosure, depending upon the material selected as the material from which the third layer 9 is comprised. For example, when metal turnings are selected as the particle from which the third layer 9 is comprised, they may be of much larger size, on an average basis, than when sand is used, but may still be effective for providing an anti-skid surface on the final multi-layer coating provided hereby. In some embodiments, the function of the third layer 9 is to provide increased friction on the surface of the finished multi-layer coating produced in accordance with the instant disclosure. Essentially any particle size in the range of between about 100 microns to 3.0 centimeters in diameter are suitable, including every tenth millimeter increment within such range and all ranges therebetween, when the particles are substantially spherical. However, as in the case of metal turnings, or crushed glass, chipped chert, chipped flint, etc., the length diameter of the particle may be somewhat longer than its width dimension, and the particles may have any length between about 100 microns to about 4 centimeters, including every tenth millimeter increment within such range and all ranges of sizes therebetween, and any width between about 100 microns to about 4 centimeters, including every tenth millimeter increment within such range and all ranges of size therebetween. In one embodiment, the third layer 9 is comprised of recycled crushed glass. In another embodiment, the third layer 9 is comprised of sand, having an average particle size between about 1 and 2 millimeters, such as the "play sand" suitable for use in children's sandboxes commonly sold at Home Depot and other like retail outlets. In another embodiment, the third layer 9 is comprised of a fractured flint product such as fractured flint #2 supplied by Sterling Supply in Minneapolis Minn. from the Pritchard Okla. area. In another embodiment, the third layer 9 is comprised of obsidian particles. In another embodiment, the third layer 9 is comprised of ground recycled thermoplastic polyolefins particles. In another embodiment, the third layer 9 is comprised of silica particles. Thus, the third layer 9 may be comprised of any solid material, with naturally occurring stone (crushed or non-crushed), being preferred, and with vitreous natural stone, such as obsidians, cherts, flints, glasses, sands and the like being especially preferred, within any of the size ranges mentioned above. The optional third layer 9 may also comprise materials which impart a decorative appearance to a multi-layer coating provided by the instant disclosure. Chips of vinyl polymers, acrylic polymers and paint chips are suitable for this purpose and may have any desired coloration. Non-limiting examples are the materials available from Torginol, Inc. of Sheboygan Falls, Wis. (website http://www.torginol.com) under the tradename TORGACHIPS™ decorative chips, including all sizes and colors provided thereby or otherwise known in the art. Preferred materials include Saddle Tan ¼" Chip™ product, ¼" Tan Chip™ product, and ¼" Gunflint Trail Chip™ product, available from Citadel Floor Finishing Systems of Blaine, Minn. The third layer 9 is preferably applied over the second layer 7 prior to the cure of the second layer 7, preferably just after the second layer 7 has been laid, to enable the particles which comprise the third layer 9 to be adhered well to the composition of the second layer 7, in which the second layer 7 can be thought of as functioning as an adhesive. A plurality of particles comprising a third layer 9 according to this disclosure may be used with or in any multi-layered structure disclosed herein. The third layer 9, when present, may be any thickness which enables a top layer 11 to be applied over it to produce a durable multi-layer coating having sufficient internal cohesive strength so as to not be damaged under normal wear, tear, and traffic.

The top layer 11 is in one embodiment is disposed over the second layer 7, when a second layer is selected to be present, and is in another embodiment disposed over the third layer 9, when a third layer 9 is selected to be present. In other embodiments, the top layer 11 may be disposed over the first layer 5 when a second layer 7 is selected to be not present. In other embodiments, the optional third layer 9 may be disposed over the first layer 5, and the top layer 11 disposed over the third layer 9.

In some embodiments, the top layer 11 comprises a layer of a polyaspartic polyurea polymer coating. Suitable coating materials from which a polyaspartic polyurea coating suitable as a top layer 11 may be provided include those indicated as being sufficient for providing a second layer 7 according to the present disclosure. When a coating composition that comprises a polyaspartic polyurea is used to provide a top layer 11, such compositions can be employed within the same physical parameters and methods of application as previously specified for cases when such materials are employed in providing a second layer 7.

In other embodiments, the top layer 11 comprises a layer of a polyurea polymer coating. A polyurea coating material from which a polyurea polymer top layer 11 can be provided can be a single-component or a two-part polyurea. Any polyurea coating material made using isocyanates and polyamines specified herein or known in the art are useful in providing a polyurea coating material from which the top layer 11 may be comprised, including those polyurea coatings materials specified herein as being suitable for providing a first layer 5. Polyurea coating materials can be employed within the same physical parameters and methods of application as previously specified for cases when such materials are employed in providing a first layer 5.

In other embodiments, the top layer 11 comprises a layer of a polyurethane polymer coating. A polyurethane coating material suitable for providing a top layer 11 as herein described includes without limitation CFFS-DC™ coating, available from Citadel; however, any polyurethane coating material made using isocyanates specified herein and polyols known in the art are useful as a coating material from which the top layer 11 may be comprised, including those polyurethane coatings materials specified or otherwise provided herein as being suitable for providing a first layer 5 and/or a second layer 7. Such materials can be employed within the same physical parameters and methods of application as previously specified for cases when such materials are employed in providing a first layer 5 and/or a second layer 7.

In other embodiments, the top layer 11 comprises a layer of a urethane-modified acrylic polymer coating. Coating materials indicated herein as being sufficient for providing a second layer 7 comprising a urethane-modified acrylic polymer are also suitable for providing a top layer 11. When a coating composition that comprises a urethane-modified acrylic is used to provide a top layer 11, such compositions can be used within the same physical parameters and methods of application as previously specified for cases when urethane-modified acrylic polymer materials are employed in providing a second layer 7.

Various dyes, tints, pigmentation materials and the like are known to be useful as components of compositions from which coating products for various substrates are commercially available. Any layer of a multi-layered structure disclosed herein may have a pigmenting additive mixed in with it prior to application to a selected substrate, in order to impart a coloration desired by the end user, provided that such pigmentation product does not react with or otherwise adversely affect the performance of the coating's layers.

The following examples shall be construed as but a few possible alternate embodiments of the teachings of the present disclosure, and not delimitive thereof in any way.

Example 1

A concrete floor in a residential garage at an ambient temperature of about 73 degrees F. is acid-etched using 5% (wt.) hydrochloric acid, rinsed and allowed to dry for one hour. A first layer coating of CFFS-711™ epoxy coating (Citadel) is applied at a rate of 400 square feet per gallon (sq. ft./gal.). The first layer is permitted to cure for 45 minutes, and a second layer of CFFS-711™ is applied at the same coverage rate. After an additional 45 minutes of waiting, a top layer of CFFS-RG 70™ (Citadel) coating is applied at a rate of 400 sq. ft./gal. One and one half hours after laying the CFFS-RG 70™ coating, the multi-layer coated structure is ready for normal traffic and use.

Example 2

A concrete floor in a workshop area at an ambient temperature of about 72 degrees F. is acid-etched using 5% (wt.)

hydrochloric acid, rinsed and allowed to dry for one hour. A first layer coating of CFFS-711™ epoxy coating (Citadel) is applied at a rate of 400 square feet per gallon (sq. ft./gal.). The first layer is permitted to cure for 45 minutes, and a second layer comprising CFFS-RG 70™ (Citadel) coating is applied at a rate of 400 sq. ft./gal. After an additional 45 minutes of waiting, a top layer of CFFS-RG 70™ coating is applied at a rate of 400 sq. ft./gal. One and one-half hours after laying the second CFFS-RG 70™ coating, the multi-layer coated structure is ready for normal traffic and use.

Example 3

A concrete floor in a garage at an ambient temperature of about 65 degrees F. is acid-etched using 5% (wt.) hydrochloric acid, rinsed and allowed to dry for one hour. A first layer coating of CFFS-711™ epoxy coating (Citadel) is applied at a rate of 400 square feet per gallon (sq. ft./gal.). The first layer is permitted to cure for 45 minutes, and a second layer comprising CFFS-RG 70™ (Citadel) coating is applied at a rate of 400 sq. ft./gal. After an additional 45 minutes of waiting, a top layer of ORDCLR/W™ coating (Citadel) is applied at a rate of 400 sq. ft./gal. One and one-half hours after laying the ORDCLR/W™ coating, the multi-layer coated structure is ready for normal traffic and use.

Example 4

A concrete floor in a workshop area at an ambient temperature of about 70 degrees F. is acid-etched using 5% (wt.) hydrochloric acid, rinsed and allowed to dry for one hour. A first layer coating of CFFS-711™ epoxy coating (Citadel) is applied at a rate of 400 square feet per gallon (sq. ft./gal.). The first layer is permitted to cure for 45 minutes, and a second layer comprising CFFS-RG 70™ (Citadel) coating is applied at a rate of 400 sq. ft./gal. After an additional 45 minutes of waiting, a top layer of CHEMTHANE® 1400 polyurea coating is applied at a rate of 400 sq. ft./gal. Two hours after laying the polyurea coating, the multi-layer coated structure is ready for normal traffic and use.

Example 5

A concrete floor in a workshop area at an ambient temperature of about 70 degrees F. is profiled by grinding the surface with a 20-50 grit diamond wheel grinder, the moisture content of the concrete being less than 5.5% using a TRAMEX® 3 moisture meter. A first layer coating of CFFS-511™ polyurethane coating (Citadel) is applied at a rate of 400 square feet per gallon (sq. ft./gal.). The first layer is permitted to cure for 45 minutes, and a top layer comprising CFFS-511™ coating is applied at a rate of 400 sq. ft./gal. After an additional 2 hours, the multi-layer coated structure is ready for normal traffic and use.

Example 6

A concrete floor in a workshop area at an ambient temperature of about 70 degrees F. is profiled by grinding the surface with a 20-50 grit diamond wheel grinder, the moisture content of the concrete being less than 5.5% using a TRAMEX® 3 moisture meter. A first layer coating of CFFS-511™ polyurethane coating (Citadel) is applied at a rate of 400 square feet per gallon (sq. ft./gal.). The first layer is permitted to cure for 45 minutes, and a second layer comprising CFFS-511™ coating is applied at a rate of 400 sq. ft./gal. The second layer is permitted to cure for 45 minutes, and a top layer comprising CFFS-511™ coating is applied at a rate of 400 sq. ft./gal. After an additional 2 hours, the multi-layer coated structure is ready for normal traffic and use.

Example 7

A concrete floor in a workshop area at an ambient temperature of about 70 degrees F. is profiled by grinding the surface with a 20-50 grit diamond wheel grinder, the moisture content of the concrete being less than 5.5% using a TRAMEX® 3 moisture meter. A first layer coating of CFFS-RG 70™ polyurea coating (Citadel) is applied at a rate of 600 square feet per gallon (sq. ft./gal.). The first layer is permitted to cure for 45 minutes, and a second layer comprising CFFS-RG 70™ coating is applied at a rate of 400 sq. ft./gal. The second layer is permitted to cure for 45 minutes, and a top layer comprising CFFS-RG 70™ coating is applied at a rate of 250 sq. ft./gal. After an additional 4 hours, the multi-layer coated structure is ready for normal traffic and use.

Example 8

A concrete floor in a workshop area at an ambient temperature of about 70 degrees F. is profiled by grinding the surface with a 20-50 grit diamond wheel grinder, the moisture content of the concrete being less than 5.5% using a TRAMEX® 3 moisture meter. A first layer coating of CFFS-RG 70™ polyurea coating (Citadel) is applied at a rate of 300 square feet per gallon (sq. ft./gal.). The first layer is permitted to cure for 45 minutes, and a second layer comprising CFFS-RG 70™ coating is applied at a rate of 250 sq. ft./gal. The second layer is permitted to cure for an additional 2 hours, at which time the multi-layer coated structure is ready for normal traffic and use.

Example 9

A concrete floor in a workshop area at an ambient temperature of about 70 degrees F. is profiled by grinding the surface with a 20-50 grit diamond wheel grinder, the moisture content of the concrete being less than 5.5% using a TRAMEX® 3 moisture meter. A first layer coating of CFFS-RG 70™ polyurea coating (Citadel) is applied at a rate of 300 square feet per gallon (sq. ft./gal.). Immediately thereafter, the surface is covered with 0.25" chips, "Saddle Tan" from Torginol, Inc. at a rate of one pound per 10 square feet. The first layer with the chip atop it is subsequently permitted to cure for 45 minutes, and a second layer comprising CFFS-RG 70™ coating is applied at a rate of 250 sq. ft./gal. The second layer is permitted to cure for an additional 2 hours, at which time the multi-layer coated structure is ready for normal traffic and use.

Example 10

A concrete floor in a workshop area at an ambient temperature of about 70 degrees F. is profiled by grinding the surface with a 20-50 grit diamond wheel grinder, the moisture content of the concrete being less than 5.5% using a TRAMEX® 3 moisture meter. A first layer coating of CFFS-RG 70™ polyurea coating (Citadel) is applied at a rate of 600 square feet per gallon (sq. ft./gal.). The first layer is permitted to cure for 45 minutes, and a second layer comprising CFFS-RG 70™ coating is applied at a rate of 400 sq. ft./gal. Immediately after applying the second layer, the surface is covered with 0.0625" chips, "Gunflint Trail" from Torginol, Inc. at a rate of one pound per 7 square feet. The second layer is then permitted to cure for 45 minutes, and a top layer comprising CFFS-RG 70™ coating is applied at a rate of 250 sq. ft./gal. After an additional 4 hours, the multi-layer coated structure is ready for normal traffic and use.

Example 11

A concrete floor in a workshop area at an ambient temperature of about 70 degrees F. is acid-etched using 5% (wt.) hydrochloric acid, rinsed a and allowed to dry for one hour. A first layer coating of CFFS-711™ epoxy coating (Citadel) is applied at a rate of 400 square feet per gallon (sq. ft./gal.). The first layer is permitted to cure for 45 minutes, and a second layer comprising CFFS-RG 70™ (Citadel) coating is applied at a rate of 1000 sq. ft./gal. Immediately after applying the second layer, the surface is covered with 0.125" chips, "Tan" from Torginol, Inc. at a rate of one pound per 7 square feet. After an additional 45 minutes of waiting, a top layer of CHEMTHANE® 1400 polyurea coating is applied at a rate of 400 sq. ft./gal. Two hours after laying the polyurea coating, the multi-layer coated structure is ready for normal traffic and use.

Thus, the present disclosure provides various embodiments of multi-layered coated structures which comprise: a) a substrate; b) a first layer disposed over the substrate, the first layer comprising a coating material selected from the group consisting of: epoxy polymer coatings, polyurea polymer coatings, and urethane polymer coatings; c) an optional second layer disposed over the first layer, the optional second layer comprising a coating material selected from the group consisting of: epoxy polymer coatings, polyaspartic polyurea polymer coatings, polyurea polymer coatings, urethane polymer coatings and urethane-modified acrylic polymer coatings; d) a top layer disposed over a layer selected from the group consisting of: the optional second layer when present and the first layer when the optional second layer is not present, the top layer comprising a coating material selected from the group consisting of: polyaspartic polyurea polymer coatings, polyurea polymer coatings, urethane polymer coatings, and urethane-modified acrylic polymer coatings. For some instances in which the user of technology as taught herein does not desire a second layer to be present, the top layer may be disposed directly atop the first layer. In other instances in which the user of technology as taught herein does not desire a second layer to be present, a layer of solid particles (including without limitation, materials described and suggested herein as being suitable as third layer materials), may be disposed directly over the first layer, and subsequently a top layer material is applied over the first layer/solid particle layer.

In a first general embodiment of the various embodiments, the first layer comprises an epoxy polymer which has a thickness of any thickness in the range of between about 0.8 mils and about 5 mils; and the second layer, when present, has a thickness of any thickness in the range of between about 1 mil and about 5 mils; and the top layer has a thickness of any thickness in the range of between about 2 mils and about 7 mils. In one embodiment according to the first general embodiment, the second layer, when present, and the top layer both comprise a polyaspartic polyurea polymer. In another embodiment according to the first general embodiment, the second layer, when present, comprises a polyaspartic polyurea polymer, and the top layer comprises a polyurea polymer. In another embodiment according to the first general embodiment, the second layer, when present, comprises a polyaspartic polyurea polymer, and the top layer comprises a urethane-modified acrylic polymer. In another embodiment according to the first general embodiment, the second layer, when present, comprises a polyaspartic polyurea polymer, and the top layer comprises a urethane polymer. In another embodiment according to the first general embodiment, the second layer, when present, comprises an epoxy polymer and the top layer comprises a polyaspartic polyurea polymer. In another embodiment according to the first general embodiment, the second layer, when present, comprises an epoxy polymer, and the top layer comprises a polyurea polymer. In another embodiment according to the first general embodiment, the second layer, when present, comprises an epoxy polymer, and the top layer comprises a urethane-modified acrylic polymer. In another embodiment according to the first general embodiment, the second layer, when present, comprises a epoxy polymer, and the top layer comprises a urethane polymer. In another embodiment according to the first general embodiment, the second layer, when present, comprises a urethane-modified acrylic polymer, and the top layer comprises a polyaspartic polyurea polymer. In another embodiment according to the first general embodiment, the second layer, when present, comprises a urethane-modified acrylic polymer, and the top layer comprises a polyurea polymer. In another embodiment according to the first general embodiment, the second layer, when present, comprises a urethane-modified acrylic polymer, and the top layer comprises a urethane-modified acrylic polymer. In another embodiment according to the first general embodiment, the second layer, when present, comprises a urethane-modified acrylic polymer, and the top layer comprises a urethane polymer. In another embodiment according to the first general embodiment, the second layer, when present, comprises a polyurea polymer, and the top layer comprises a polyaspartic polyurea polymer. In another embodiment according to the first general embodiment, the second layer, when present, comprises a polyurea polymer, and the top layer comprises a polyurea polymer. In another embodiment according to the first general embodiment, the second layer, when present, comprises a polyurea polymer, and the top layer comprises a urethane-modified acrylic polymer. In another embodiment according to the first general embodiment, the second layer, when present, comprises a polyurea polymer, and the top layer comprises a urethane polymer. In another embodiment according to the first general embodiment, the second layer, when present, comprises a urethane polymer, and the top layer comprises a polyaspartic polyurea polymer. In another embodiment according to the first general embodiment, the second layer, when present, comprises a urethane polymer, and the top layer comprises a polyurea polymer. In another embodiment according to the first general embodiment, the second layer, when present, comprises a urethane polymer, and the top layer comprises a urethane-modified acrylic polymer. In another embodiment according to the first general embodiment, the second layer, when present, comprises a urethane polymer, and the top layer comprises a urethane polymer.

In a second general embodiment of the various embodiments, the first layer comprises a urethane polymer which has a thickness of any thickness in the range of between about 0.8 mils and about 5 mils; and the second layer, when present, has a thickness of any thickness in the range of between about 1 mil and about 5 mils; and the top layer has a thickness of any thickness in the range of between about 2 mils and about 7 mils. In another embodiment according to the second general embodiment, the second layer, when present, and the top layer both comprise a polyaspartic polyurea polymer. In another embodiment according to the second general embodiment, the second layer, when present, comprises a polyaspartic polyurea polymer, and the top layer comprises a polyurea polymer. In another embodiment according to the second general embodiment, the second layer, when present, comprises a polyaspartic polyurea polymer, and the top layer comprises a urethane-modified acrylic polymer. In another embodiment according to the second general embodiment, the second layer, when present, comprises a polyaspartic polyurea polymer, and the top layer comprises a urethane polymer. In another embodiment according to the second general embodiment, the second layer, when present, comprises an epoxy polymer and the top layer comprises a polyaspartic polyurea polymer. In another embodiment according to the second general embodiment, the second layer, when present, comprises an epoxy polymer, and the top layer comprises a polyurea polymer. In another embodiment according to the second general embodiment, the second layer, when present, comprises an epoxy polymer, and the top layer comprises a urethane-modified acrylic polymer. In another embodiment according to the second general embodiment, the second layer, when present, comprises a epoxy polymer, and the top layer comprises a urethane polymer. In another embodiment according to the second general embodiment, the second layer, when present, comprises a urethane-modified acrylic polymer, and the top layer comprises a polyaspartic polyurea polymer. In another embodiment according to the second general embodiment, the second layer, when present, comprises a urethane-modified acrylic polymer, and the top layer comprises a polyurea polymer. In another embodiment according to the second general embodiment, the second layer, when present, comprises a urethane-modified acrylic polymer, and the top layer comprises a urethane-modified acrylic polymer. In another embodiment according to the second general embodiment, the second layer, when present, comprises a urethane-modified acrylic polymer, and the top layer comprises a urethane polymer. In another embodiment according to the second general embodiment, the second layer, when present, comprises a polyurea polymer, and the top layer comprises a polyaspartic polyurea polymer. In another embodiment according to the second general embodiment, the second layer, when present, comprises a polyurea polymer, and the top layer comprises a polyurea polymer. In another embodiment according to the second general embodiment, the second layer, when present, comprises a polyurea polymer, and the top layer comprises a urethane-modified acrylic polymer. In another embodiment according to the second general embodiment, the second layer, when present, comprises a polyurea polymer, and the top layer comprises a urethane polymer. In another embodiment according to the second general embodiment, the second layer, when present, comprises a urethane polymer, and the top layer comprises a polyaspartic polyurea polymer. In another embodiment according to the second general embodiment, the second layer, when present, comprises a urethane polymer, and the top layer comprises a polyurea polymer. In another embodiment according to the second general embodiment, the second layer, when present, comprises a urethane polymer, and the top layer comprises a urethane-modified acrylic polymer. In another embodiment according to the second general embodiment, the second layer, when present, comprises a urethane polymer, and the top layer comprises a urethane polymer.

In third general embodiment of the various embodiments, the first layer comprises a polyurea polymer which has a thickness of any thickness in the range of between about 0.8 mils and about 5 mils; the second layer, when present, has a thickness of any thickness in the range of between about 1 mil and about 5 mils; and the top layer has a thickness of any thickness in the range of between about 2 mils and about 7 mils. In another embodiment according to the third general embodiment, the second layer, when present, and the top layer both comprise a polyaspartic polyurea polymer. In another embodiment according to the third general embodiment, the second layer, when present, comprises a polyaspartic polyurea polymer, and the top layer comprises a polyurea polymer. In another embodiment according to the third general embodiment, the second layer, when present, comprises a polyaspartic polyurea polymer, and the top layer comprises a urethane-modified acrylic polymer. In another embodiment according to the third general embodiment, the second layer, when present, comprises a polyaspartic polyurea polymer, and the top layer comprises a urethane polymer. In another embodiment according to the third general embodiment, the second layer, when present, comprises an epoxy polymer and the top layer comprises a polyaspartic polyurea polymer. In another embodiment according to the third general embodiment, the second layer, when present, comprises an epoxy polymer, and the top layer comprises a polyurea polymer. In another embodiment according to the third general embodiment, the second layer, when present, comprises an epoxy polymer, and the top layer comprises a urethane-modified acrylic polymer. In another embodiment according to the third general embodiment, the second layer, when present, comprises a epoxy polymer, and the top layer comprises a urethane polymer. In another embodiment according to the third general embodiment, the second layer, when present, comprises a urethane-modified acrylic polymer, and the top layer comprises a polyaspartic polyurea polymer. In another embodiment according to the third general embodiment, the second layer, when present, comprises a urethane-modified acrylic polymer, and the top layer comprises a polyurea polymer. In another embodiment according to the third general embodiment, the second layer, when present, comprises a urethane-modified acrylic polymer, and the top layer comprises a urethane-modified acrylic polymer. In another embodiment according to the third general embodiment, the second layer, when present, comprises a urethane-modified acrylic polymer, and the top layer comprises a urethane polymer. In another embodiment according to the third general embodiment, the second layer, when present, comprises a polyurea polymer, and the top layer comprises a polyaspartic polyurea polymer. In another embodiment according to the third general embodiment, the second layer, when present, comprises a polyurea polymer, and the top layer comprises a polyurea polymer. In another embodiment according to the third general embodiment, the second layer, when present, comprises a polyurea polymer, and the top layer comprises a urethane-modified acrylic polymer. In another embodiment according to the third general embodiment, the second layer, when present, comprises a polyurea polymer, and the top layer comprises a urethane polymer. In another embodiment according to the third general embodiment, the second layer, when present, comprises a urethane polymer, and the top layer comprises a polyaspartic polyurea polymer. In another embodiment according to the third general embodiment, the second layer, when present, comprises a urethane polymer, and the top layer comprises a polyurea polymer. In another embodiment according to the third general embodiment, the second layer, when present, comprises a urethane polymer, and the top layer comprises a urethane-modified acrylic polymer. In another embodiment according to the third general embodiment, the second layer, when present, comprises a urethane polymer, and the top layer comprises a urethane polymer.

In certain embodiments, the substrate is a horizontal concrete surface and the top layer is sufficiently cured to enable passage of a motorized vehicle over the substrate within twenty-four hours of initial application of the first layer to the substrate, and whereby the multi-layered structure, is not damaged by the passage of the motorized vehicle over the substrate. In other embodiments, the substrate is a horizontal concrete surface and the top layer is sufficiently cured to enable passage of a motorized vehicle over the substrate within fourteen hours of initial application of the first layer to the substrate, and whereby the multi-layered structure, is not damaged by the passage of the motorized vehicle over the substrate. A motorized vehicle for purposes of these embodiments is a 2005 Ford F-150 ½ ton pickup truck in its base stock configuration. In another embodiment, the substrate is selected to be a horizontal concrete surface and the top layer is sufficiently cured to enable passage of pedestrians walking over the substrate within six hours of initial application of the first layer to the substrate, and whereby the multi-layered structure is not damaged by the passage of the pedestrians over the substrate. In another embodiment, the substrate is selected to be a horizontal concrete surface and the top layer is sufficiently cured to enable passage of pedestrians walking over the substrate within three hours of initial application of the first layer to the substrate, and whereby the multi-layered structure is not damaged by the passage of the pedestrians over the substrate. Within this specification, the terms "normal traffic and use" and words of similar import can mean either motorized vehicle traffic, or pedestrian traffic. A multi-layered coating structure as provided herein may be considered to be not damaged by motorized vehicle or pedestrian traffic if the integrity of the structure is not compromised by the forces of such traffic.

Consideration must be given to the fact that although this disclosure has been described and disclosed in relation to certain preferred embodiments, obvious equivalent modifications and alterations thereof will become apparent to one of ordinary skill in this art upon reading and understanding this specification and the claims appended hereto. This includes subject matter defined by any combination of any one of the various claims appended hereto with any one or more of the remaining claims, including the incorporation of the features and/or limitations of any dependent claim, singly or in combination with features and/or limitations of any one or more of the other dependent claims, with features and/or limitations of any one or more of the independent claims, with the remaining dependent claims in their original text being read and applied to any independent claims so modified. This also includes combination of the features and/or limitations of one or more of the independent claims with features and/or limitations of another independent claims to arrive at a modified independent claim, with the remaining dependent claims in their original text being read and applied to any independent claim so modified.

I claim:

1. A process for providing a multi-layered structure which comprises the steps of:
    a) providing a substrate;
    b) coating said substrate with a first layer, said first layer comprising an aqueous dispersion of a coating material selected from the group consisting of: epoxy polymer coatings, polyurea polymer coatings, and urethane polymer coatings;
    c) coating said first layer with a second layer, said second layer being compositionally different from said first layer, and comprising an aqueous dispersion of a coating material selected from the group consisting of: epoxy polymer coatings, polyaspartic polyurea polymer coatings, polyurea polymer coatings, urethane polymer coatings and urethane-modified acrylic polymer coatings; and
    d) coating said second layer with a top layer material, said top layer material comprising an aqueous dispersion of a coating material selected from the group consisting of: polyaspartic polyurea polymer coatings, polyurea polymer coatings, urethane polymer coatings, and urethane-modified acrylic polymer coatings, said substrate being a concrete surface, and wherein said top layer is sufficiently cured to enable passage of a motorized vehicle over said substrate within twenty-four hours of initial application of said first layer to said substrate, said multi-layered structure not being damaged by such passage of said motorized vehicle over said substrate.

2. A process according to claim 1 wherein the step of coating said second layer with a top layer is initiated within one hour of the coating of said substrate with said first layer.

3. A process according to claim 1 wherein the step of coating said second layer with a top layer is initiated within two hours of the coating of said substrate with said first layer.

4. A process according to claim 1 wherein the step of coating said second layer with a top layer is initiated within three hours of the coating of said substrate with said first layer.

5. A process according to claim 1 wherein the step of coating said second layer with a top layer is initiated within four hours of the coating of said substrate with said first layer.

6. A process according to claim 1 wherein the step of coating said second layer with a top layer is initiated within six hours of the coating of said substrate with said first layer.

7. A process according to claim 1 wherein the step of coating said second layer with a top layer is initiated within eight hours of the coating of said substrate with said first layer.

8. A process according to claim 1 wherein the application of said top layer is completed within one hour from the time of initial application of said first layer to said substrate.

9. A process according to claim 1 wherein the application of said top layer is completed within two hours from the time of initial application of said first layer to said substrate.

10. A process according to claim 1 wherein the application of said top layer is completed within three hours from the time of initial application of said first layer to said substrate.

11. A process according to claim 1 wherein the application of said top layer is completed within four hours from the time of initial application of said first layer to said substrate.

12. A process according to claim 1 wherein the application of said top layer is completed within six hours from the time of initial application of said first layer to said substrate.

13. A process according to claim 1 wherein the application of said top layer is completed within eight hours from the time of initial application of said first layer to said substrate.

14. A process according to claim 1 wherein the application of said top layer is completed within ten hours from the time of initial application of said first layer to said substrate.

15. A process according to claim 1 wherein the application of said top layer is completed within twelve hours from the time of initial application of said first layer to said substrate.

16. A process according to claim 1 wherein said top layer is tack-free within six hours of initial application of said first layer to said substrate.

17. A process according to claim 1 wherein said top layer is tack-free within four hours of initial application of said first layer to said substrate.

18. A process according to claim 1 wherein said top layer is tack-free within two hours of initial application of said first layer to said substrate.

19. A process according to claim 1 wherein said substrate is a horizontal concrete surface and wherein said top layer is sufficiently cured to enable passage of a motorized vehicle over said substrate within twenty-four hours of initial application of said first layer to said substrate, and whereby said multi-layered structure, is not damaged by the passage of said motorized vehicle over said substrate.

20. A process according to claim 1 wherein said substrate is a horizontal concrete surface and wherein said top layer is sufficiently cured to enable passage of a motorized vehicle over said substrate within fourteen hours of initial application of said first layer to said substrate, and whereby said multi-layered structure, is not damaged by the passage of said motorized vehicle over said substrate.

21. A process according to claim 1 wherein said substrate is a horizontal concrete surface and wherein said top layer is sufficiently cured to enable passage of pedestrians walking over said substrate within six hours of initial application of said first layer to said substrate, and whereby said multi-layered structure is not damaged by the passage of said pedestrians over said substrate.

22. A process according to claim 1 wherein said substrate is a horizontal concrete surface and wherein said top layer is sufficiently cured to enable passage of pedestrians walking over said substrate within three hours of initial application of said first layer to said substrate, and whereby said multi-layered structure, is not damaged by the passage of said pedestrians over said substrate.

23. A process according to claim 1 wherein an additional layer comprising a plurality of particles is broadcast over said second layer prior to its full cure and prior to said step of coating said second layer with a top layer.

24. A process for providing a multi-layered structure which comprises the steps of:
  a) providing a substrate, wherein said substrate comprises concrete;
  b) treating said substrate with an aqueous mineral acid;
  c) coating said substrate with a first layer, said first layer comprising an aqueous dispersion that includes at least one polymer coating material selected from the group consisting of: epoxy polymer coatings, polyurea polymer coatings, and urethane polymer coatings;
  d) coating said first layer with a second layer, said second layer being compositionally different from said first layer, and comprising an aqueous dispersion of a coating material selected from the group consisting of: epoxy polymer coatings, polyaspartic polyurea polymer coatings, polyurea polymer coatings, urethane polymer coatings and urethane-modified acrylic polymer coatings;
  e) optionally coating a layer selected from the group consisting of: said first layer; and said second layer with a third layer comprising a plurality of particles; and
  f) coating said second layer with a top layer material comprising an aqueous dispersion of a coating material selected from the group consisting of: polyaspartic polyurea polymer coatings, polyurea polymer coatings, urethane polymer coatings, and urethane-modified acrylic polymer coatings, wherein said top layer is sufficiently cured to enable passage of a motorized vehicle over said substrate within fourteen hours of initial application of said first layer to said substrate, said multi-layered structure not being damaged by such passage of said motorized vehicle over said substrate.

25. A process according to claim 24 wherein said aqueous mineral acid comprises one or more acids selected from the group consisting of: hydrochloric acid; hydrobromic acid; hydiodic acid; phosphoric acid; phosphorous acid; sulfuric acid; and nitric acid, and wherein said acid is present in any amount between about 2% and 15% by weight based on the total weight of the acid solution.

26. A process according to claim 24 wherein the step of applying said first layer to said substrate is initiated within about 2 hours of initiating the step of treating said substrate with an aqueous mineral acid.

27. A process according to claim 24 wherein the step of applying said first layer to said substrate is initiated within about 1 hour of completing the step of treating said substrate with an aqueous mineral acid.

28. A process according to claim 24 wherein the step of treating said substrate with an aqueous mineral acid includes a drying step in which said substrate is dried or allowed to dry after application of said aqueous acid.

29. A process according to claim 28 wherein the step of applying said first layer to said substrate is initiated within about 1 hour of completion of said drying step.

30. A process according to claim 28 wherein the step of applying said first layer to said substrate is initiated within about 30 minutes of completion of said drying step.

31. A process according to claim 28 wherein the step of applying said first layer to said substrate is initiated within about 15 minutes of completion of said drying step.

32. A process according to claim 28 wherein the step of applying said first layer to said substrate is initiated immediately after completion of said drying step.

33. A process according to claim 24 wherein the step of treating said substrate with an aqueous mineral acid includes a rinsing step after application of said aqueous acid, and a drying step, subsequent to said rinsing step.

* * * * *